United States Patent
Olkin

(10) Patent No.: US 10,311,141 B1
(45) Date of Patent: Jun. 4, 2019

(54) DATA DRIVEN SPREADSHEET CHART SYSTEM

(71) Applicant: Workday, Inc., Pleasanton, CA (US)

(72) Inventor: Terry M. Olkin, Niwot, CO (US)

(73) Assignee: Workday, Inc., Pleasanton, CA (US)

( * ) Notice: Subject to any disclaimer, the term of this patent is extended or adjusted under 35 U.S.C. 154(b) by 6 days.

(21) Appl. No.: 14/860,468

(22) Filed: Sep. 21, 2015

(51) Int. Cl.
  *G06F 3/00* (2006.01)
  *G06F 17/24* (2006.01)
  *G06F 17/21* (2006.01)

(52) U.S. Cl.
  CPC .......... *G06F 17/246* (2013.01); *G06F 17/212* (2013.01); *G06F 17/243* (2013.01)

(58) Field of Classification Search
  CPC ..... G06F 17/246; G06F 17/212; G06F 17/243
  See application file for complete search history.

(56) References Cited

U.S. PATENT DOCUMENTS

| | | | | |
|---|---|---|---|---|
| 6,057,837 A * | 5/2000 | Hatakeda | ............. | G06F 17/246 715/708 |
| 9,798,889 B1 * | 10/2017 | Karpel | ................ | G06F 21/6209 |
| 9,870,362 B2 * | 1/2018 | Lee | ................... | G06F 17/30056 |
| 2002/0091728 A1 * | 7/2002 | Kjaer | .................... | G06F 17/246 715/212 |
| 2006/0015805 A1 * | 1/2006 | Humenansky | ......... | G06F 17/246 715/209 |
| 2006/0059417 A1 * | 3/2006 | Hoffmann | ............ | G06Q 10/067 715/219 |
| 2007/0061752 A1 * | 3/2007 | Cory | ....................... | G06F 9/543 715/804 |
| 2009/0282325 A1 * | 11/2009 | Radakovitz | ........... | G06F 17/246 715/217 |
| 2010/0312803 A1 * | 12/2010 | Gong | ................ | G06F 17/30572 707/805 |
| 2011/0093770 A1 * | 4/2011 | Kamimura | ........ | G06F 17/30554 715/227 |
| 2012/0042242 A1 * | 2/2012 | Garland | ................ | G06F 17/215 715/256 |
| 2012/0137203 A1 * | 5/2012 | Schodl | .................. | G06F 17/246 715/215 |
| 2013/0067305 A1 * | 3/2013 | Golan | ................... | G06F 17/215 715/219 |
| 2014/0372854 A1 * | 12/2014 | Otero | .................... | G06F 17/246 715/219 |
| 2015/0170384 A1 * | 6/2015 | Matsumoto | ............. | G06T 11/60 345/629 |

* cited by examiner

*Primary Examiner* — Kyle R Stork
(74) *Attorney, Agent, or Firm* — Van Pelt, Yi & James LLP

(57) ABSTRACT

A data-driven spreadsheet chart system includes an interface and a processor. The interface is to receive a formula entered into a cell of a spreadsheet document, wherein the formula includes a function that references a set of data. The processor is to host the spreadsheet document and render a visual representation of the data for display entirely within the cell.

13 Claims, 13 Drawing Sheets

DATA DRIVEN SPREADSHEET CHART SYSTEM

BACKGROUND OF THE INVENTION

Computer spreadsheet applications allow users to manage and visualize large amounts of data. Typically, these applications allow users to visualize the data using charts. A user creates a chart by manually selecting a portion of the spreadsheet data, usually using a cursor or a mouse, and interacting with a series of user dialogs to create and visually format a chart of the data. The manually generated chart is then overlaid on top of the spreadsheet data. However, this computer system functionality is inefficient since each chart is generated and adjusted manually.

BRIEF DESCRIPTION OF THE DRAWINGS

Various embodiments of the invention are disclosed in the following detailed description and the accompanying drawings.

DETAILED DESCRIPTION

Figure 1:
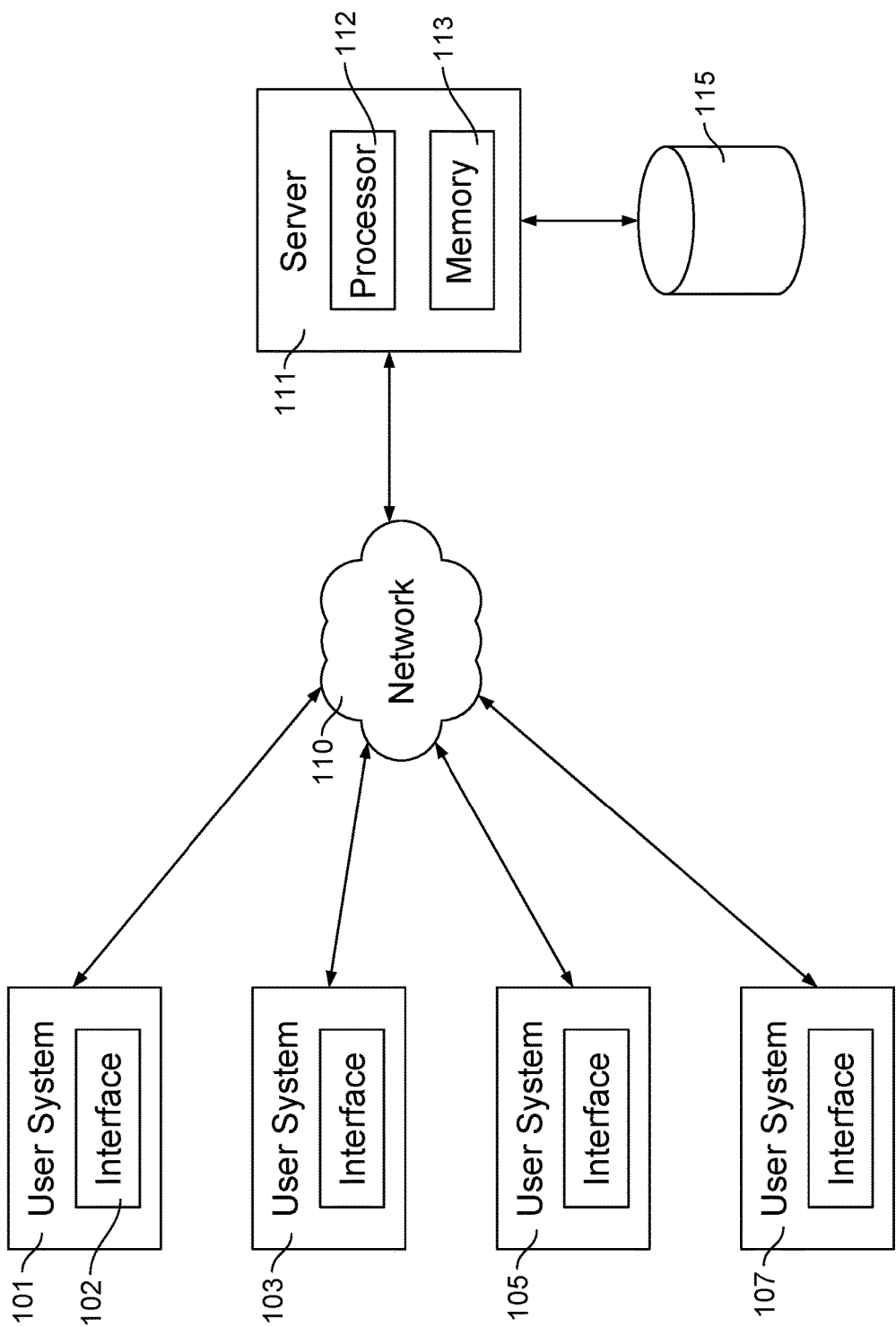
FIG. 1 is a block diagram illustrating an embodiment of a data-driven spreadsheet chart system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A data-driven spreadsheet chart system is disclosed. The system comprises a processor. The processor is to host a spreadsheet document; receive a formula entered into a cell of the spreadsheet document, wherein the formula includes a function that references a set of data; and render a visual representation of the set of data for display entirely within the cell. In some embodiments, the processor is coupled to a memory, which is configured to provide the processor with instructions.

In some embodiments, the system enables the data-driven creation of charts to visualize spreadsheet data. For example, a user accesses a spreadsheet document hosted by a spreadsheet application. In some embodiments, the spreadsheet application is hosted on a software as a service (SaaS) platform. The user enters into a cell of the spreadsheet document a formula that includes a visualization function such as a chart function. The visualization function takes as one set of arguments a cell reference expression that refers to a set of data stored in cells of the spreadsheet. The spreadsheet application processes the formula and renders a visual representation of the set of data based on the visualization function (e.g., a function that generates a chart). The visual representation is displayed entirely within the cell that contains the formula. In some embodiments, the formula includes an argument that refers to a second formula nested in the cell or of a second cell.

In some embodiments, improved computer functionality is achieved for visualization of data. Specifically, a graphical display of data is made more efficient and flexible using a function-based chart capability for a spreadsheet. A function-based chart capability is driven by input parameters. In various embodiments, input parameters are updated by changes to cell values, are static data values, or are any other appropriate parameter inputs. In the event that an input parameter (e.g., a cell value, chart type, etc.) is updated for a chart function, then the chart automatically updates its graphical display for the new input parameter. For example, in the event that the chart type input parameter is changed from a line type chart to a bar type chart, then the display of the chart is automatically updated from a line graph display of the data to a bar graph display of the data.

In some embodiments, a graphical display of a chart is bounded by a cell size (e.g., the width and the height of the chart is set to be the size of the cell width and cell height, respectively). The size of the chart updates as the cell size is updated. For example, in the event the cell's row or cell's column size changes (e.g., an indication is received that a dimension has been changed—for example, using a dragging operation on a cell edge, using a text input for a dimension of a cell, etc.), then the height (e.g., corresponding to the row height change) or the width (e.g., corresponding to the column width change) changes automatically for the chart, respectively. In the event that the cell is merged with other cells, then the chart automatically updates and becomes the size of the merged cells. In some embodiments, the graphical display of the chart is in the same plane as the neighboring cells.

In some embodiments, a change to an argument of the chart function or a change in the cell size causes an automatic update to the rendering of the chart.

FIG. 1 is a block diagram illustrating an embodiment of a data-driven spreadsheet chart system. In the example shown, application server 111 includes processor 112 and memory 113. Application server 111 is coupled to external storage 115 so that application server 111 is able to store information to and access information from external storage 115. In some embodiments, external storage 115 comprises a database, a cluster of databases, a solid state memory, a hard disc, a redundant array of discs, or any other appropriate storage hardware. In some embodiments, storage for application server 111 uses memory 113 or internal storage comprising a database, a cluster of databases, a solid state memory, a hard disc, a redundant array of discs, or any other appropriate storage hardware. Application server 111 is also coupled to network 110. In some embodiments, network 110 comprises one or more of the following: a local area network, a wide area network, a wired network, a wireless network, the Internet, or any other appropriate network or combination of networks. User system 101, user system 103, user system 105, and user system 107 access application server 111 via network 110. In some embodiments, user system 101, user system 103, user system 105, and user system 107 access an application running on application server 111 (e.g., a spreadsheet document application). In some embodiments, a spreadsheet application presents a spreadsheet based on stored data. In some embodiments, the data stored comprises spreadsheet data and metadata. User system 101 includes a user interface 102 used to access application server 111. In some embodiments, user interface 102 is used to access an application running on application server 111. In some embodiments, user interface 102 relies on a web browser to access a spreadsheet application running on application server 111.

In various embodiments, application server 111 comprises one or more physical servers with one or more processors, one or more memories, and one or more other storage devices (e.g., hard drives, array of drives, etc.) and/or one or more virtual environments (e.g., virtualization of operating system or application processes) in which an application is executed. In some examples, application server 111 comprises one or more servers that are part of a software as a service (SaaS) platform.

Figure 2:
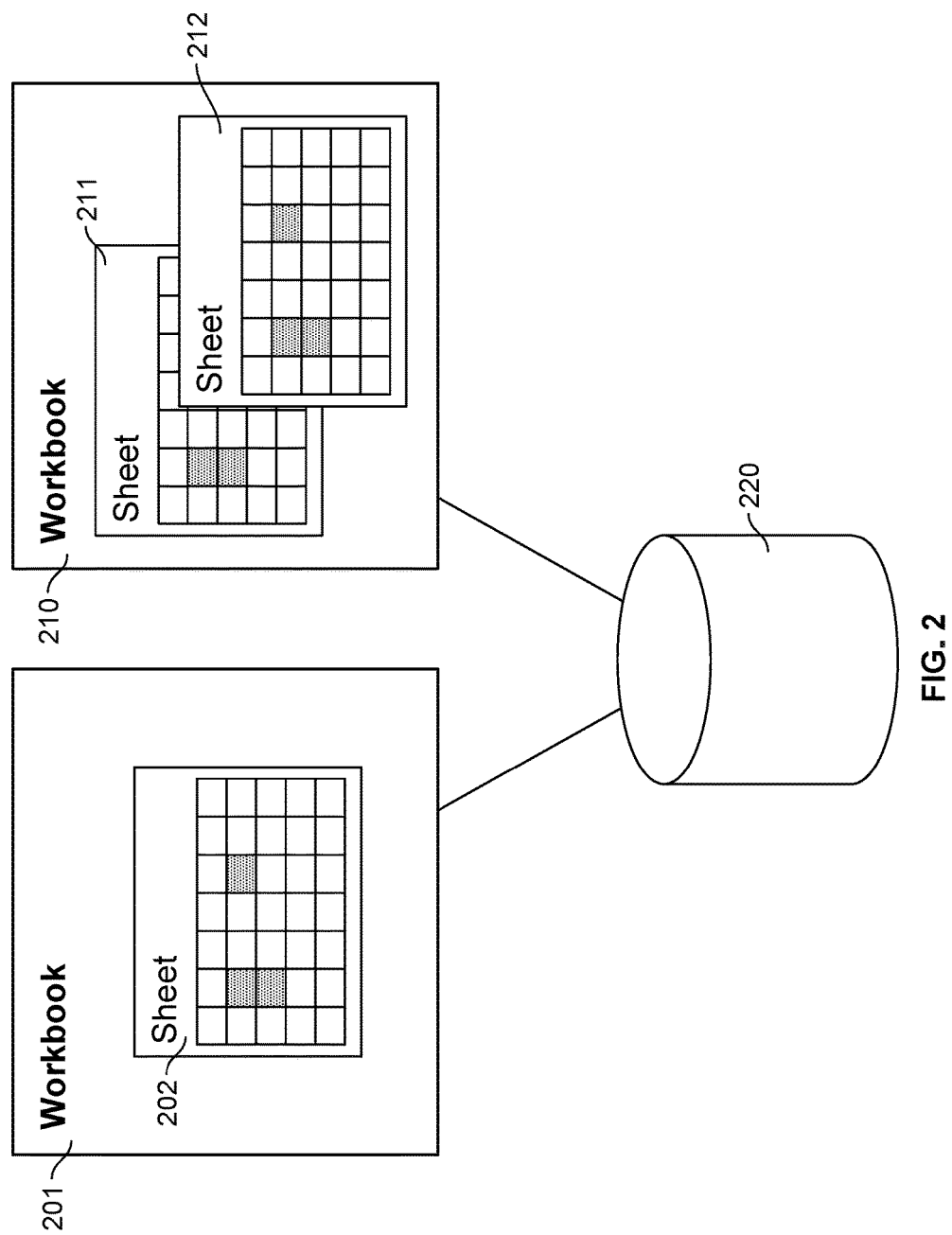
FIG. 2 is a block diagram illustrating an embodiment of a data-driven spreadsheet chart system.

FIG. 2 is a block diagram illustrating an embodiment of a data-driven spreadsheet chart system. In some embodiments, the system of FIG. 2 comprises a spreadsheet application executing on application server 111 of FIG. 1. In some embodiments, workbooks 201 and 210 are hosted on application server 111 of FIG. 1. In some embodiments, external storage 220 utilizes external storage 115 of FIG. 1. In the example shown, workbook 201 and workbook 210 are two different spreadsheet documents. Workbook 201 includes a single sheet 202. Workbook 210 includes sheet 211 and sheet 212. The data corresponding to workbook 201 and workbook 210, including the data in sheet 202, sheet 211, and sheet 212, are stored in external storage 220. In some embodiments, external storage 220 comprises a remote database, database cluster, or any other appropriate data storage device or system.

Figure 3:
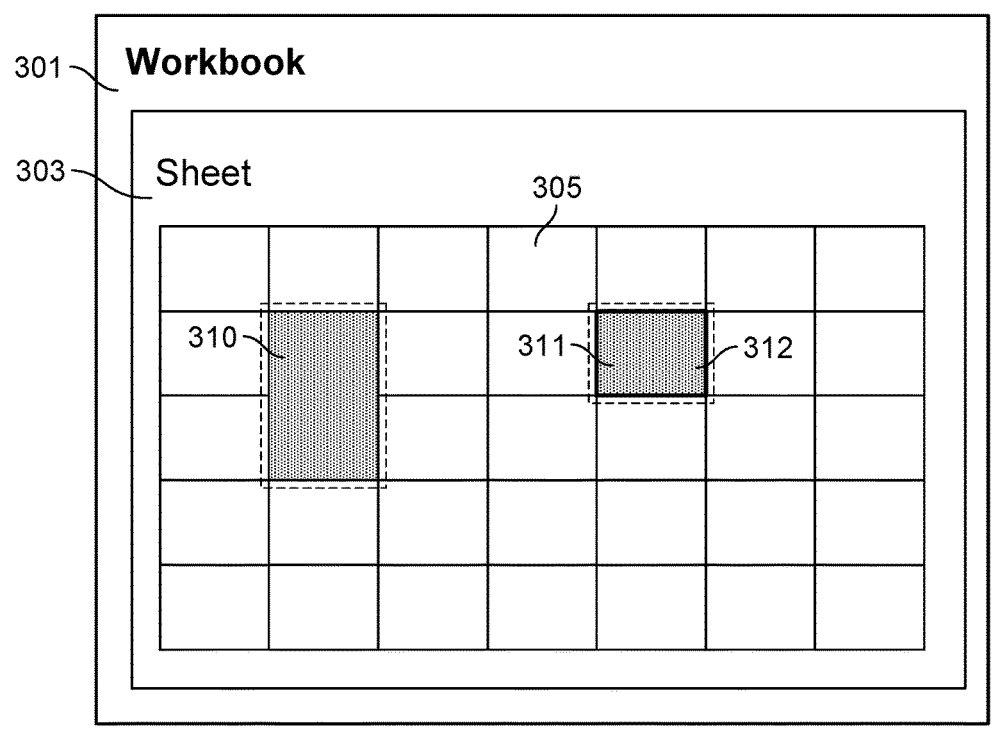
FIG. 3 is a block diagram illustrating an embodiment of a spreadsheet document for a data-driven spreadsheet chart system.

FIG. 3 is a block diagram illustrating an embodiment of a spreadsheet document for a data-driven spreadsheet chart system. In some embodiments, workbook 301 is hosted on application server 111 of FIG. 1. In some embodiments, workbook 301 comprises workbook 201 and/or workbook 210 of FIG. 2. In the example shown, workbook 301 includes a sheet (e.g., sheet 303) of a spreadsheet document. Workbooks include one or more sheets. Sheet 303 includes a table of cells 305. Table of cells 305 is arranged in a grid. Table of cells 305 contains two regions (e.g., region 310 and region 311). A region of cells can be both rectangular and non-rectangular. Region 310 is a rectangular region (e.g., a region originally made up of two cells—one cell above another cell—that are merged into a single merged cell). Region 311 is a rectangular region made up of a single cell 312. Cell 312 is a single cell that exists in workbook 301, sheet 303, table 305, and region 311. In various embodiments, region 311 and cell 312 contain a formula that includes a chart function. In various embodiments, region 310 includes a merged cell that contains a formula that includes a chart function. In various embodiments, region 310 and/or region 311 is/are shared with one or more other users.

Figure 4:
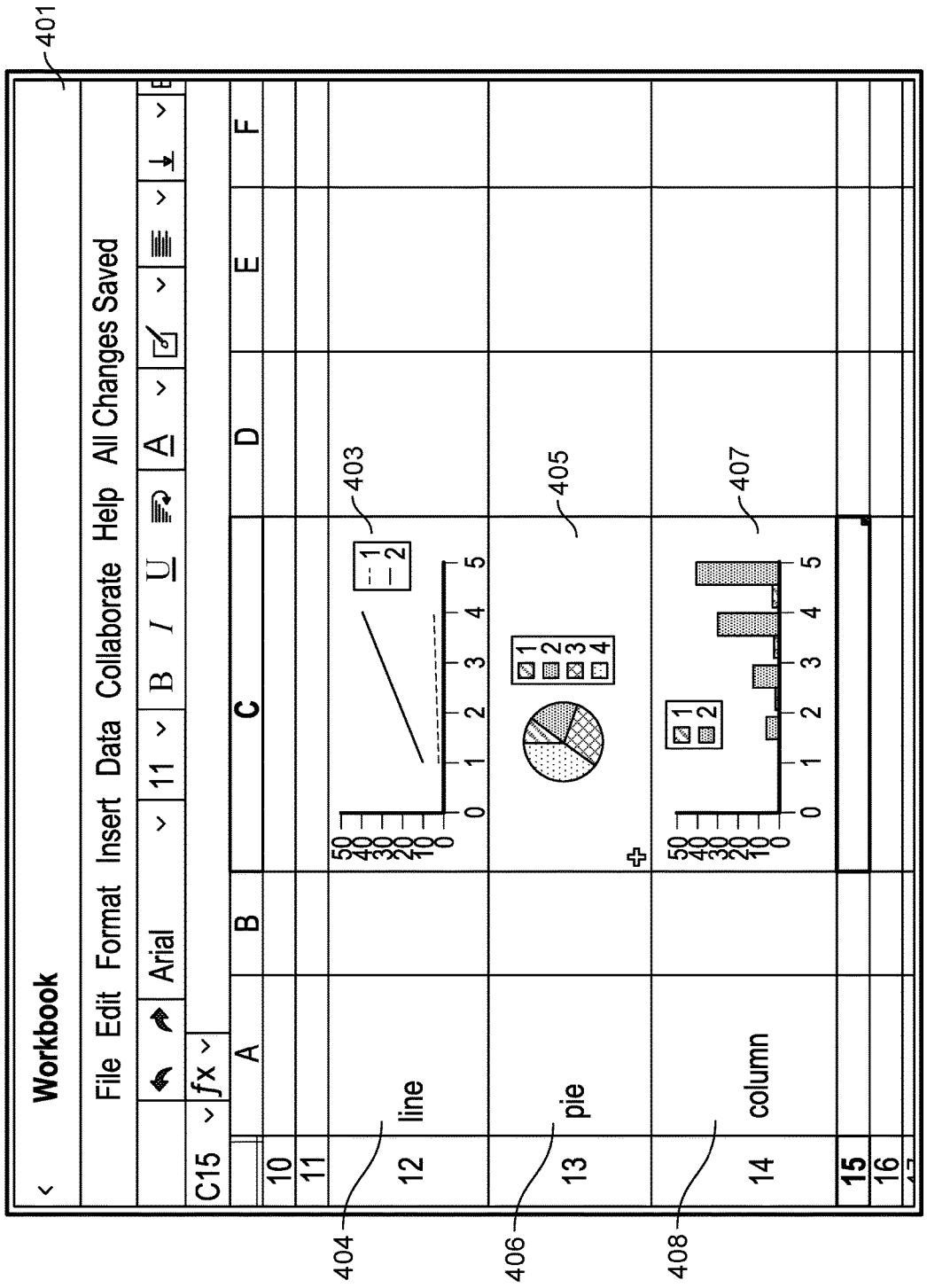
FIG. 4 is a diagram illustrating an embodiment of a display of a spreadsheet document with data-driven charts.

FIG. 4 is a diagram illustrating an embodiment of a display of a spreadsheet document with data-driven charts. In some embodiments, workbook 401 is hosted on application server 111 of FIG. 1. In the example shown, workbook 401 includes cell 403, cell 405, and cell 407. Cell 403 corresponds to cell C12 of workbook 401. Cell 405 corresponds to cell C13 of workbook 401. Cell 407 corresponds to cell C14 of workbook 401. Cell 403, cell 405, and cell 407 each display a chart. Cell 403 displays a line chart. Cell 405 displays a pie chart. Cell 407 displays a column chart. In the example shown, workbook 401 includes cell 404, cell 406, and cell 408. Cell 404 corresponds to cell A12 of workbook 401 and contains the text "line." Cell 406 corresponds to cell A13 of workbook 401 and contains the text "pie." Cell 408 corresponds to cell A14 of workbook 401 and contains the text "column." In some embodiments, the charts of cell 403, cell 405, and cell 407 are data-driven charts generated using a chart function, which takes as an argument a chart type. Various examples of chart types include line, pie, column, bar, scatter, area, and any other appropriate chart type. In some embodiments, the line chart of cell 403 is generated by parsing cell 404, which contains the value "line," as an argument. The pie chart of cell 405 is generated by parsing cell 406, which contains the value "pie," as an argument. The column chart of cell 407 is generated by parsing cell 408, which contains the value "column," as an argument. In this manner, the chart type argument is used to dynamically create a chart that is displayed in the cell with a formula that includes a chart function. In the example shown, the charts in cell 403, cell 405, and cell 407 are rendered to the cell size defined by cell 403, cell 405, and cell 407, respectively. For example, the width and height of the line chart of cell 403 increases (or decreases) as the width and height of cell 403 increases (or decreases). If a cell is enlarged, the chart displayed in the cell is rendered to fit the enlarged cell. If a cell is merged with additional cells to create a merged cell, the dimensions of the merged cell are used to render the chart.

Figure 5:
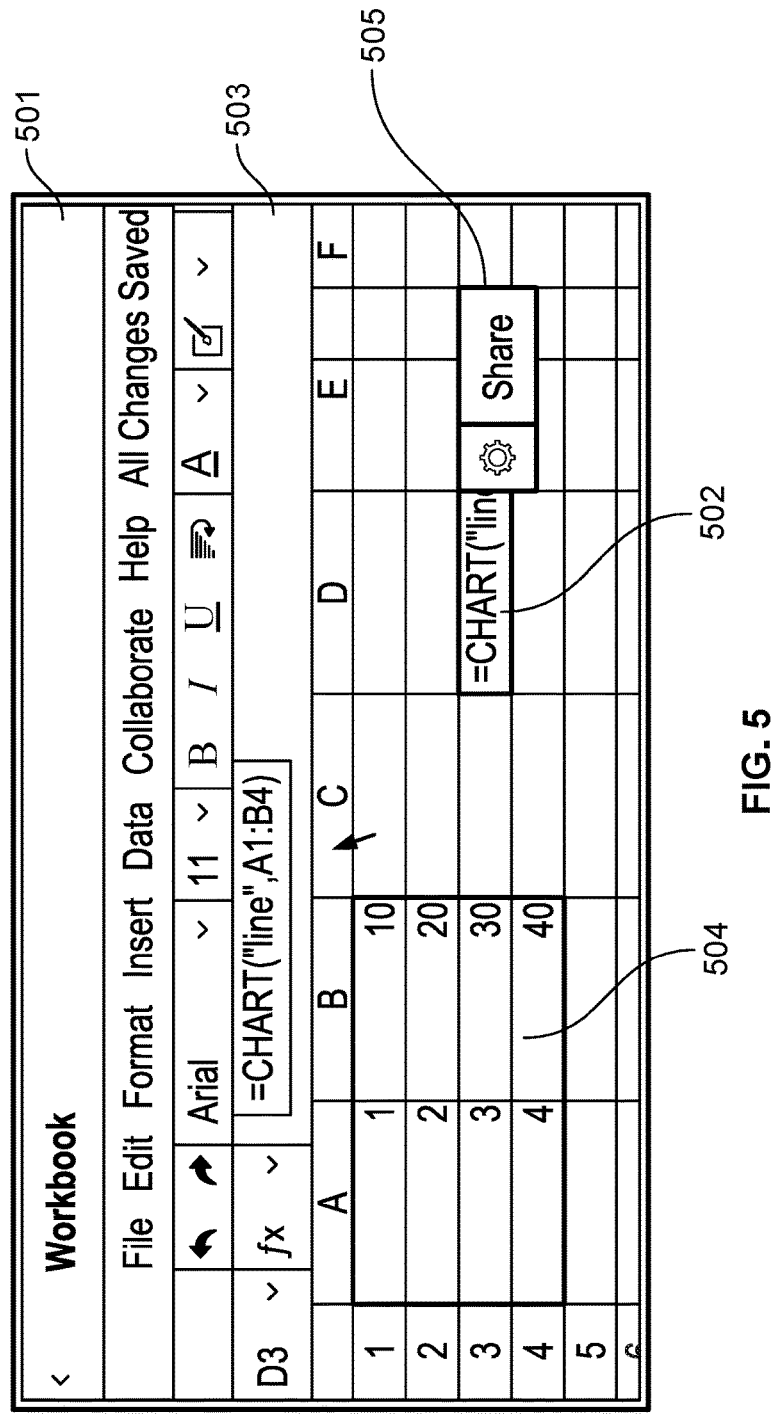
FIG. 5 is a diagram illustrating an embodiment of a display of a spreadsheet document with a data-driven chart.

FIG. 5 is a diagram illustrating an embodiment of a display of a spreadsheet document with a data-driven chart. In some embodiments, workbook 501 is hosted on application server 111 of FIG. 1. In the example shown, workbook 501 includes cell 502. Cell 502 includes a chart formula: =CHART("line", A1:B4). The formula for cell 502 is displayed in formula bar 503. The formula of cell 502 includes a chart function that uses two arguments, a chart type and a chart data. In the example shown, cell 502 uses the chart type "line" and the chart data "A1:B4", which references chart data 504. Chart data 504 is referenced using the notation A1:B4 and is two cells wide and four cells tall. In the example shown, cell 502 is the currently selected cell and the user is actively editing the formula of cell 502. In some embodiments, the arguments of the chart formula are highlighted in the spreadsheet document. For example, chart data 504 is highlighted when the user is editing the formula of cell 502. Cell 502 includes a share functionality 505. Selecting share functionality 505 allows the user to share the cell and the corresponding chart with other users. In some embodiments, sharing cell 502 shares only the chart corresponding to cell 502 and not the underlying chart data 504. In some embodiments, sharing cell 502 in an other spreadsheet document comprises maintaining or storing a reference to the original cell in the other spreadsheet document.

Figure 6:
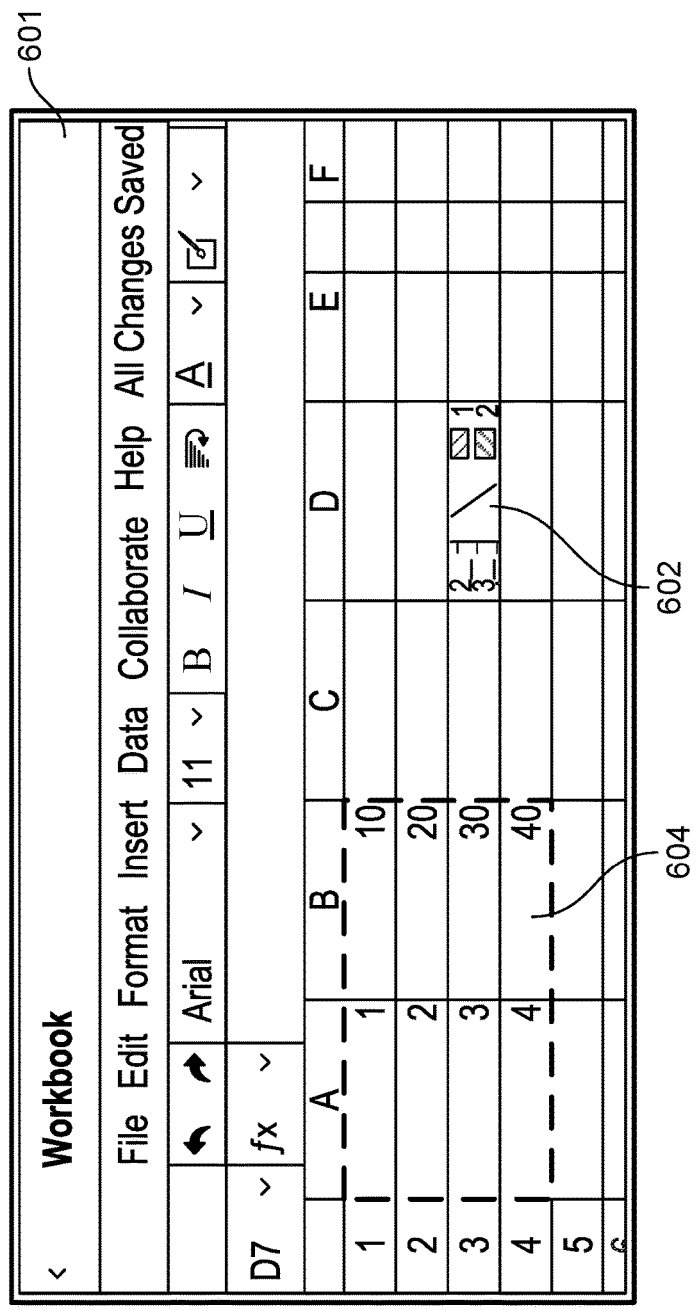
FIG. 6 is a diagram illustrating an embodiment of a display of a spreadsheet document with a data-driven chart system.

FIG. 6 is a diagram illustrating an embodiment of a display of a spreadsheet document with a data-driven chart system. In some embodiments, workbook 601 is workbook 501 of FIG. 5. In the example shown, workbook 601 includes cell 602, which includes a chart function relying on chart data 604. Once a user enters a completed chart function for the formula for cell 602, the chart function with appropriate arguments is received by the spreadsheet application and a corresponding chart is rendered within cell 602. Note that the formula for the chart function no longer appears in the formula bar due to the fact that cell 602 is no longer selected. The size of the rendered chart is dependent on the size of cell 602. Changes to data in any of the cells A1:B4 update the chart in cell 602 automatically.

Figure 7:
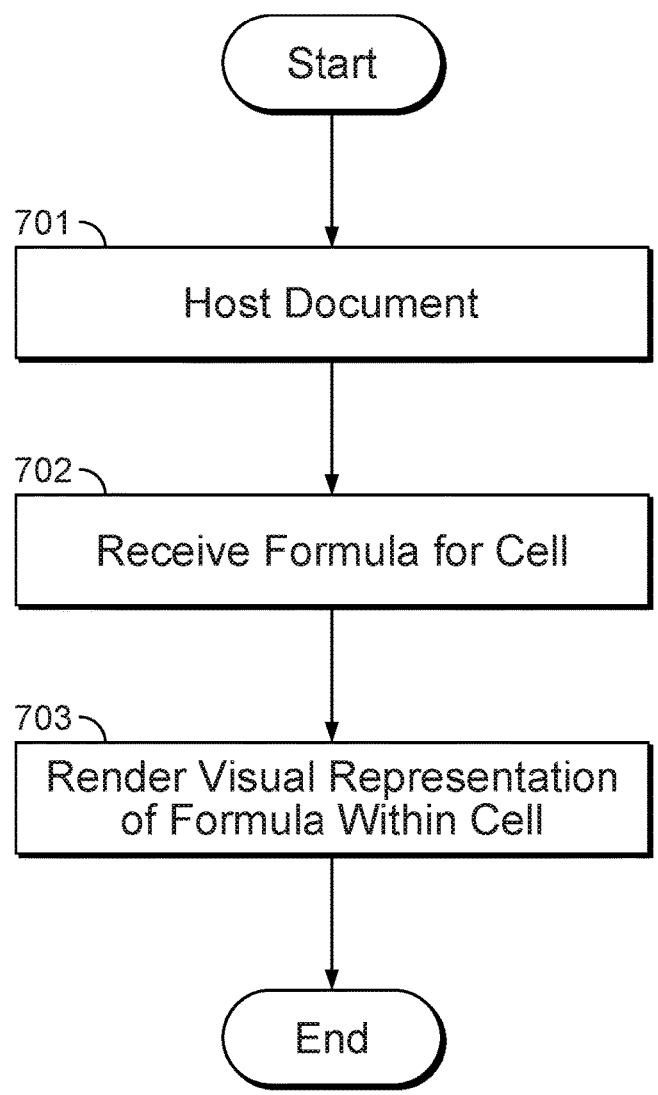
FIG. 7 is a flow diagram illustrating an embodiment of a process for data-driven charts.

FIG. 7 is a flow diagram illustrating an embodiment of a process for data-driven chart charts. In some embodiments, the process of FIG. 7 executes on application server 111 of FIG. 1 using processor 112 of FIG. 1. In some embodiments, the process of FIG. 7 is used to generate the charts in cell 403, cell 405, and cell 407 of FIG. 4 and cell 602 of FIG. 6. In the example shown, in 701, a document is hosted. For example, a spreadsheet document is hosted on a single server or on a SaaS platform. In some embodiments, a user logs in via a user interface client in order to access the hosted document. In various embodiments, logging into the user interface client comprises entering a username and password into a terminal or other prompt, entering a uniform resource locator (URL) into a Web browser, executing an application, or any other appropriate method of logging into the user interface client. In 702, a formula for a cell is received that includes a visualization function. In some embodiments, the visualization function references a set of data. For example, a user enters into a cell a formula containing a chart function that references a set of data. The data reference originates from either the workbook containing the cell or another workbook. In some embodiments, the chart function includes cells that parameterize the chart function (e.g., C4 includes a text value defining the chart type and the function refers to C4 in the chart type argument: =CHART(C4, A1:B4)). In some embodiments, a chart function has minimum arguments of chart type and data set with other chart parameters defaulted. In some embodiments, a chart function has minimum arguments of a data set with other chart parameters defaulted. In 703, a visual representation of the formula is rendered within the cell. In some embodiments, the visual representation utilizes the set of data received as part of the formula in 702. The rendering in 703 is confined to the dimension of the cell that contains the formula.

In some embodiments, after the formula for a cell is received in 702, the formula is compiled by the spreadsheet application. Compiling the formula of a cell enables very efficient execution and automatic updating, whereas interpreting the formula at each update would take too long to execute and cause an unacceptable delay for user. In some embodiments, the output of the compilation is byte code. In some embodiments, the compiled version of the formula is stored in a storage location associated with the cell. In some embodiments, compiling the formula includes performing a security check on the formula. In various embodiments, security checks include checking that the user is authorized to access the referenced data, checking that the user is authorized to invoke the functions included in the formula, or any other appropriate checks. In the event that a user does not pass a check, then the user is presented with a message and execution and/or compilation is not performed.

In some embodiments, compiling the formula is achieved using a compiler. The compiler parses and analyzes an input sequence (e.g., a formula). The compiler first determines whether there are any syntactic errors in the formula and, in the event that there are not, determines whether there are any semantic errors. In various embodiments, a check for semantic errors includes a security check, a check for valid function names, a check for valid number of arguments to functions, a check for valid types of arguments to functions, and any other appropriate check for semantic errors. In the event that there was a syntactic or semantic error, the error is provided to the user so that the user can fix the input and no byte code is generated. In the event that the syntactic and semantic checks are completed without error, the compiler then generates the byte code output. The byte code output is basically a lower level implementation of the formula in a form that a "machine" can interpret. In the data driven chart system, system byte code is generated, and this byte code is then run on a system virtual machine (e.g., similar to Java™ byte code being generated and then run on a Java™ virtual machine). After a formula is compiled into byte code, the code is stored along with the original formula in a storage location associated with the cell in which the formula was entered. When it is necessary to execute a formula in a cell, the byte code program is fetched and run that on the system virtual machine.

In some embodiments, a visualization function that creates a chart comprises:

CHART(chart-type, primary-data [, base-config] [, override-config] [, secondary-data]).

The function takes multiple arguments (e.g., chart-type and primary-data, and, as indicated by the square brackets [ ], optionally base-config, override-config, and secondary-data). The chart-type argument comprises a string that specifies the type of chart to be drawn (e.g., line, bar, pie, tree, bubble, scatter, column, gauge, area, etc.). The primary-data argument specifies the data to be charted. For example, the primary-data argument comprises a reference to cells in the current or another spreadsheet document, workbook, or sheet, or comprises a list of data values. The base-config and override-config arguments comprise lists of key-value pairs that specify and control the visual formatting for the rendering of the chart. For example, a user specifies the location of the legend, the title, the format and locations of the axis, or any other appropriate formatting parameter. By receiving base-config and override-config as arguments (e.g., parameters entered in cells), the formatting parameters are able to be shared amongst multiple cells and formulas. In some embodiments, a standard formatting style is created by having configuration parameters in cells (e.g., a base configuration) while allowing the flexibility for charts to deviate from the standard formatting style by overriding the formatting parameters using the override-config argument. In some embodiments, a base configuration is defined as base-config: {"title-position": "above", "x-axis-position": "bottom"} with an override configuration being defined as override-config: {"x-axis-position": "top"} that results in the combined configuration: {"title-position": "above", "x-axis-position": "top"} (as "top" overrides "bottom" from the base). In various embodiments, parameters to a function are partially or all references to cells on the current or another spreadsheet document, workbook, or sheet, are literal data (e.g., a list of values, an array of values, etc.), or any other appropriate input parameters. A secondary-data argument is used for charts that visualize two sets of data on the same chart within the same cell. In some embodiments, the two sets of data share one axis but have a different second axis. For example, the X-axis for both sets of data is the same but the Y-axes for the two data sets have different values. The secondary-data argument specifies a second source of data for visualization.

Figure 8:
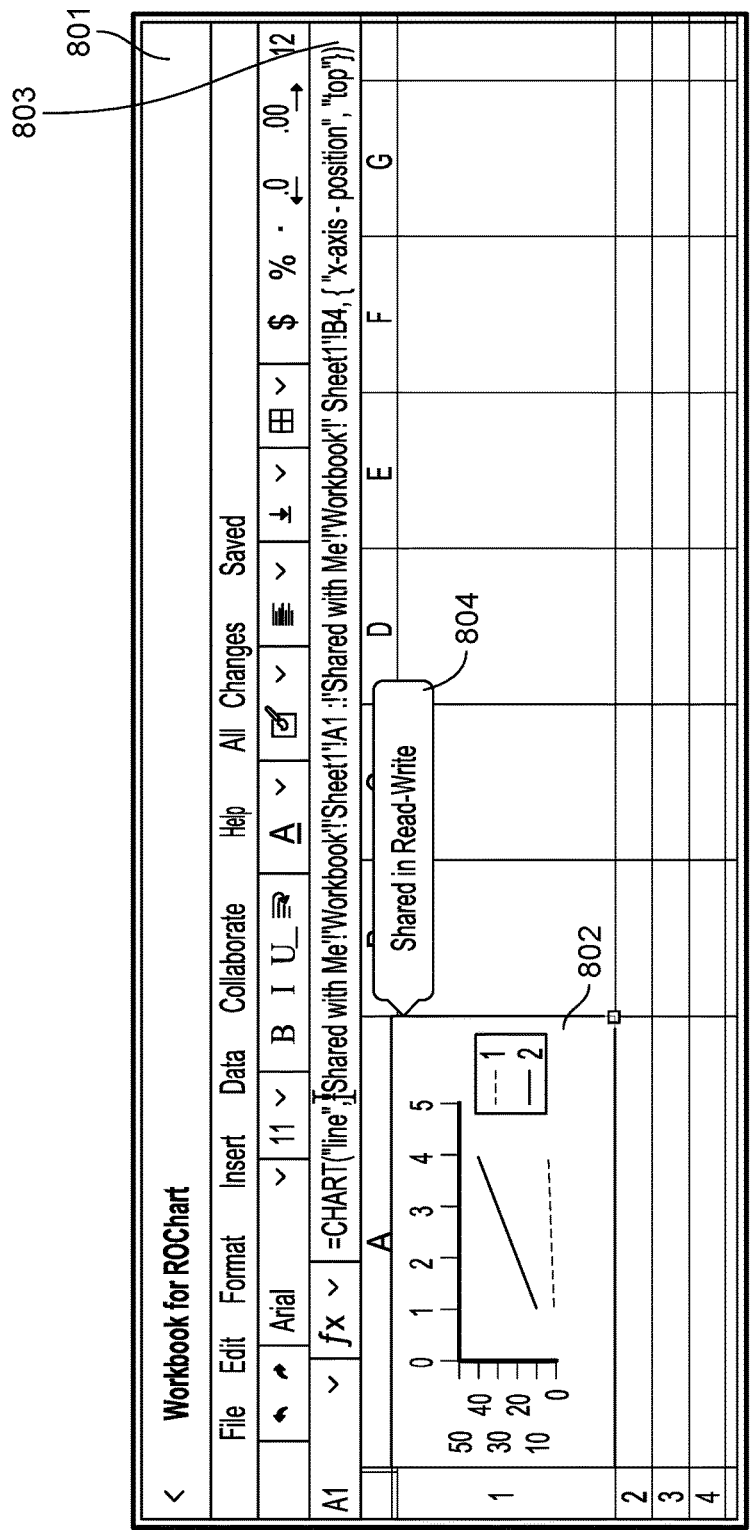
FIG. 8 is a diagram illustrating an embodiment of a display of a spreadsheet document with a data-driven chart.

FIG. 8 is a diagram illustrating an embodiment of a display of a spreadsheet document with a data-driven chart. In some embodiments, workbook 801 is hosted on application server 111 of FIG. 1. In the example shown, workbook 801 includes cell 802. Cell 802 includes a line chart referencing data from another workbook. Cell 802 has been resized and is taller than the default height for a cell. For example, the height of cell 802, which corresponds to the location A1 is larger than the cell in location A2, which has the default height. Similarly, the width of cell 802 has been resized and is wider than the default width for a cell. As a result of resizing cell 802, the rendering of the chart within cell 802 is resized to fit the dimensions of cell 802. The formula for cell 802 is displayed in formula bar 803. As shown in formula bar 803, the formula for cell 802 of workbook 801 includes a visualization function CHART and takes as an argument a reference to cells from a different workbook entitled "Workbook" that is accessible via a "Share with Me" folder or path—for example, access is achieved using: "Shared with Me!Workbook." Cell 802 includes a share status dialog 804. In some embodiments, the rendered chart is shared with other users by sharing cell 802. In various embodiments, when cell 802 is shared, the status dialog 804 displays that status associated with the sharing. In the example shown, cell 802 is shared in "Read-Write" mode. Another example of a sharing status includes "Read-Only" mode.

Figure 9:
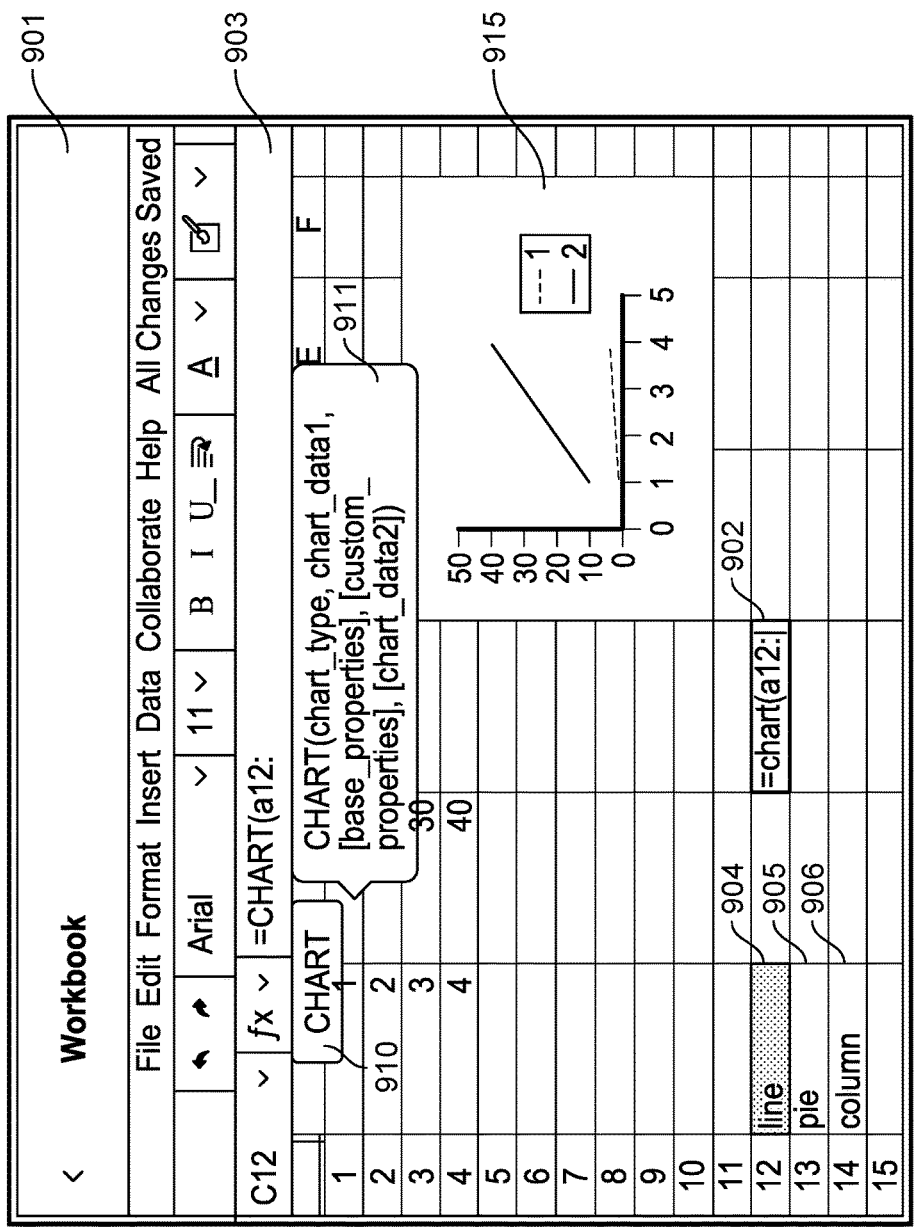
FIG. 9 is a diagram illustrating an embodiment of a display of a spreadsheet document with a data-driven chart.

FIG. 9 is a diagram illustrating an embodiment of a display of a spreadsheet document with a data-driven chart. In some embodiments, workbook 901 is hosted on application server 111 of FIG. 1. In the example shown, workbook 901 includes cell 902. Cell 902 demonstrates a user in the process of creating a data-driven chart. The user of cell 902 enters a visualization function "chart" and a first argument that corresponds to a chart-type. Formula bar 903 shows the formula in the process of a formula being entered. In formula bar 903, the first argument to the function "chart" is "a12" and is highlighted. In some embodiments, the current argument being entered into formula bar 903 is highlighted in formula bar 903 and in the event that the argument references a cell, the appropriate cell is highlighted. In this example, cell 904, which corresponds to the cell having location A12, is highlighted and contains the value "line." Cell 905 corresponds to the cell at location A13 and contains the value "pie." Cell 906 corresponds to the cell at location A14 and contains the value "column." In cell 902, the first argument is cell A12, which contains the value "line," and informs the system to create a line chart. By changing the first argument, a user creates data-driven chart visualizations. In some examples, the value for chart-type is data-driven by using different values for the chart-type argument. In the event that the function for cell 902 uses as a first argument for chart-type cell 905, which contains the value "pie", a pie chart is created. In the event that the function for cell 902 uses as a first argument for chart-type cell 906, which contains the value "column", a column chart is created.

In the example shown, workbook 901 includes function dialog 910 and function help 911. Function dialog 910 and function help 911 are displayed when a user enters a function into the formula for a cell. Function dialog 910 identifies the function entered into the formula. Function help 911 displays the help information associated with function dialog 910. In some embodiments, function help 911 includes the function signature of the function entered into formula bar 903 and shown in function dialog 910. In various embodiments, function help 911 includes the full function name, mandatory arguments, optional arguments, example user scenarios, or any other appropriate information. In the example shown, function help 911 displays the message CHART(chart_type, chart_data1, [base_properties], [custom_properties], [chart_data2]). The arguments chart_type and chart_data1 are mandatory arguments. The arguments base_properties, custom_properties, and chart_data2 are displayed in square brackets [ ] to signify that they are optional.

In the example shown, workbook 901 includes cell 915 that includes a rendered chart. Cell 915 is a merged cell that is created by selecting multiple cells and merging them into a single cell. In this example, cell 915 is created by merging cells from the region D3:F10 that is three cells wide and eight cells tall. Cell 915 illustrates how a user adjusts the area allocated for the rendered chart relative to other cells of the workbook by merging multiple cells into a single larger cell. By merging cells, a user manipulates the location and size of the rendered chart relative to neighboring cells.

Figure 10:
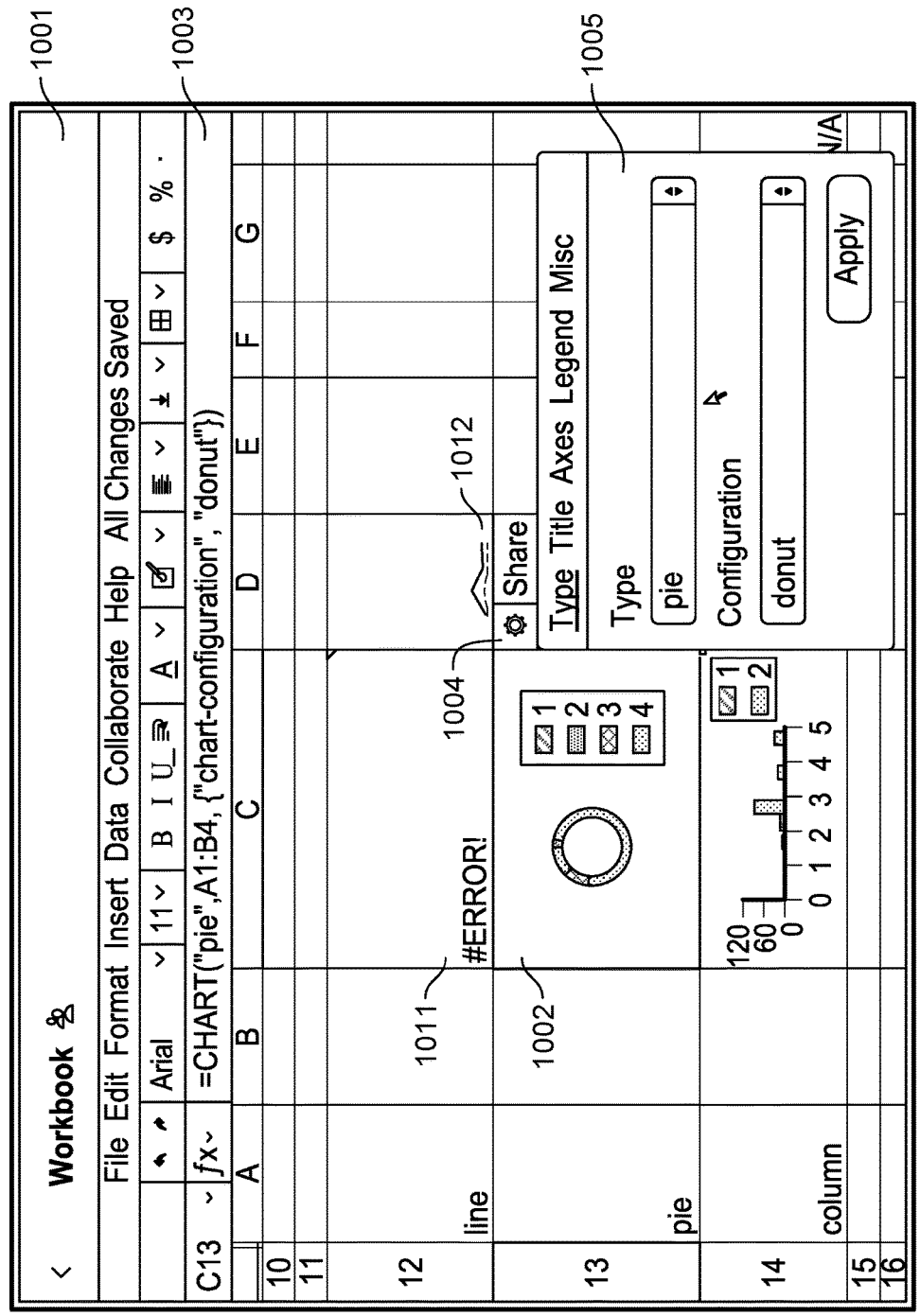
FIG. 10 is a diagram illustrating an embodiment of a display for a user interface for data-driven spreadsheet charts.

FIG. 10 is a diagram illustrating an embodiment of a display for a user interface for data-driven spreadsheet charts. In some embodiments, workbook 1001 is hosted on application server 111 of FIG. 1. In the example shown, workbook 1001 includes cell 1002. Cell 1002 displays a data-driven chart created using the formula and chart function of formula bar 1003. Formula bar 1003 includes a formula that uses the chart function and takes arguments "pie" as the chart-type, A1:B4 as a primary set of data, and the key-value pair "chart-configuration:donut." In some embodiments, the key "chart-configuration" is used to further refine the visual properties of the specified chart type. In the example shown, the value "donut" for the key "chart-configuration" refines the pie chart type that results in rendering a chart using a donut shape. When cell 1002 is selected, settings icon 1004 is displayed. In some embodiments, cell 1002 is selected by clicking on cell 1002 with a pointing device; navigating to cell 1002 using a navigation device such as a mouse, keyboard, trackpad, or any other appropriate device; hovering over cell 1002 using a navigation device; or any other appropriate means. When settings icon 1004 is selected, settings dialog 1005 is displayed. Settings dialog 1005 allows a user to modify the arguments to the function used by cell 1002 using a user interface. In the example shown, settings dialog 1005 displays panel "Type" and the corresponding settings that include chart type "pie" and the value "donut" for configuration. In some embodiments, settings dialog contains multiple configuration panels including Type, Title, Axes, Legend, Misc, and any other appropriate panel. The different panels are used to access and configure the different parameters associated with different categories of parameters used by the visualization function. In some embodiments, the different parameters correspond to arguments to the visualization function. Settings dialog 1005 contains a button labeled "Apply" that sets the arguments for the visualization function. In some embodiments, when new settings are applied, the chart is rendered in the appropriate cell to reflect the changed settings and formula bar 1003 is updated to show any new or modified arguments to the visualization function. In some embodiments, in the event that settings are updated, the new settings are stored in the compiled version stored associated with the cell. In some embodiments, in the event that settings are updated, the cell is recompiled with the new settings and stored associated with the cell.

In the example shown, cell 1012 displays a chart that is a sparkline. In some embodiments, the chart function takes as an argument a chart-type of "line" and a chart-configuration of "sparkline" that results in rendering the chart data as a sparkline.

In some embodiments, cell 1011 of workbook 1001 displays an error message in the event the function used in cell 1011 does not evaluate according to the function signature. In some embodiments, the error message includes a description identifying which portion of the function and its arguments are the cause of the error. In various embodiments, hovering over or selecting cell 1011 displays additional detail regarding the error. In some embodiments, cell 1011 displays a visual indicator that informs the user that additional details relating to the status of the cell can be revealed by selecting or hovering over cell 1011. In the example shown, the visual indicator is a dog ear, shown as a triangle in the upper right corner of cell 1011. In some embodiments, different colors for the dog ear correspond to different types of messages.

Figure 11:
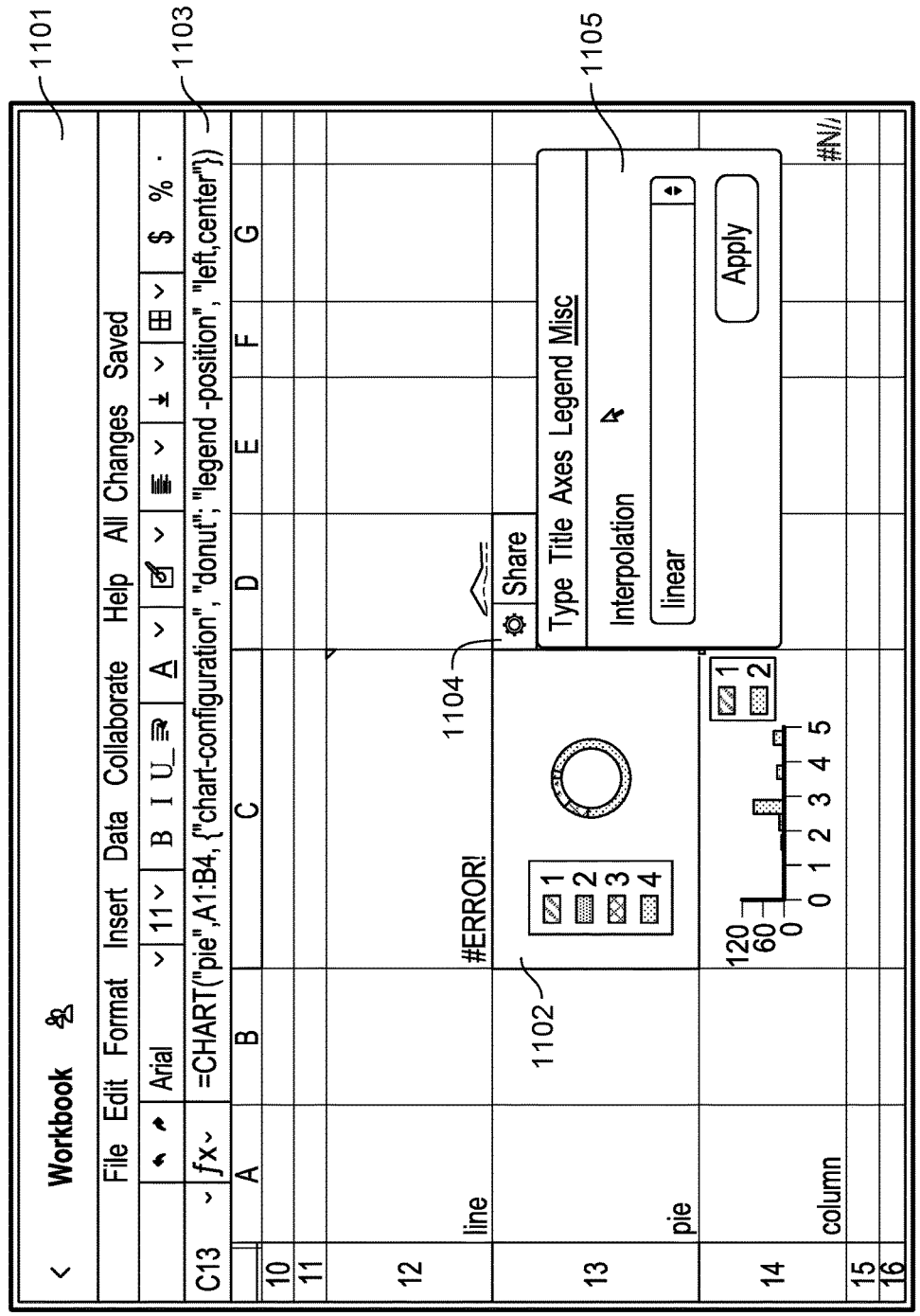
FIG. 11 is a diagram illustrating an embodiment of a display for a user interface for a data-driven spreadsheet chart system.

FIG. 11 is a diagram illustrating an embodiment of a display for a user interface for a data-driven spreadsheet chart system. In some embodiments, workbook 1101 is workbook 1001 of FIG. 10 and cell 1102 is cell 1002 of FIG. 10. In the example shown, workbook 1101 includes cell 1102. Cell 1102 displays a data-driven chart created using the formula and chart function of formula bar 1103. Formula bar 1103 includes a formula that uses the chart function and takes arguments "pie" as the chart-type, A1:B4 as a primary set of data, the key-value pair "chart-configuration:donut," and the key-value pair "legend-position:'left,center.'" In some embodiments, the key "legend-position" is used to format the visual properties of the chart that correspond to the position of the legend. In the example shown, the legend for the chart is rendered in the left-center of cell 1102. When settings icon 1104 is selected, settings dialog 1105 is displayed. In the example shown, the user has selected the "Misc" panel for settings dialog 1105. In some embodiments, the "Misc" panel displays an interpolation configuration. In the example shown, settings dialog 1105 displays that the interpolation configuration is set to "linear." Note that the linear interpolation is used when rendering a line graph. This setting controls whether a line is "pointy" at each change in value on the line or whether it is "smoothed" and more rounded (the option for this is called "curve") when looking at each plotted point.

Figure 12:
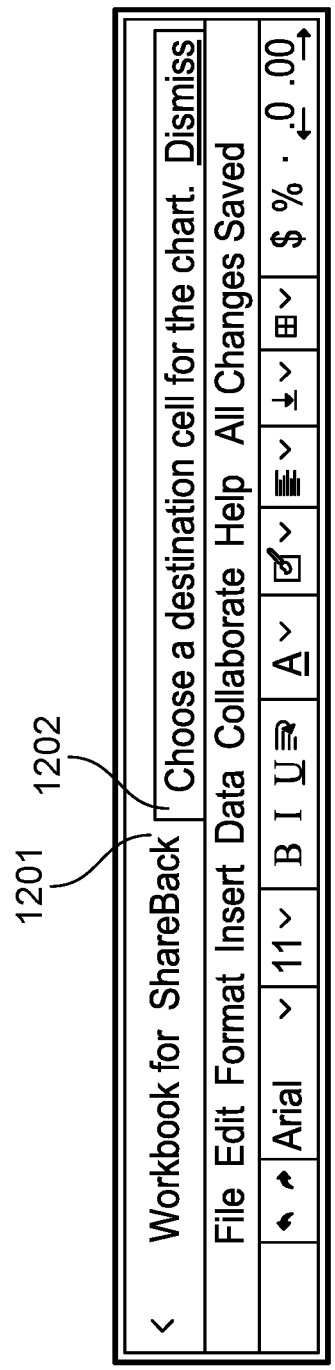
FIG. 12 is a diagram illustrating an embodiment of a display for a user interface for a data-driven spreadsheet chart system.

FIG. 12 is a diagram illustrating an embodiment of a display for a user interface for a data-driven spreadsheet chart system. In some embodiments, as an alternative to typing a formula with a visualization function into a cell, a user interface is used to construct the formula. The constructed formula is used to render the visual representation, such as a chart, in a designated cell or a group of cells. In some embodiments, a user selects a visualization function from the user interface by selecting a visualization function, such as chart, from a pull down menu, a user dialog, a panel of different visualization functions, or any other appropriate user interface. As an example, a user first selects a group of cells that contain a set of data for visualization. With the set of data selected, the user selects a chart function from a menu of the spreadsheet application. Once the function and set of data are received, a user is prompted to select a destination cell or cells for the placement of the chart. In the example shown, workbook 1201 displays dialog 1202 prompting the user to select a destination cell for the chart. In some embodiments, the user may select a single cell or a group of cells for the placement of the chart. In some embodiments, in the event that a group of cells is selected, the group is merged into a single cell. The system constructs a chart formula for the destination cell or cells using the selected visualization function and set of data.

Figure 13:
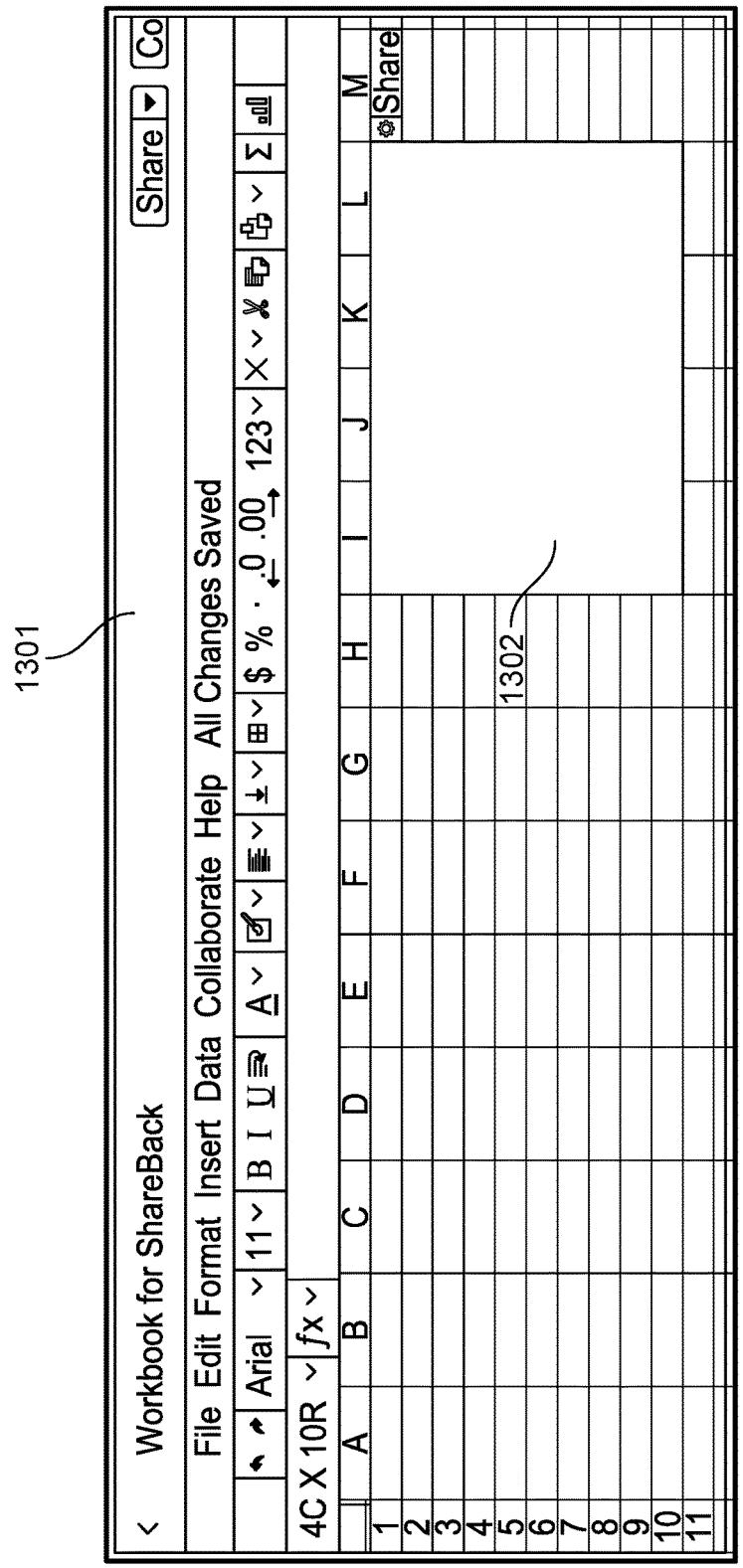
FIG. 13 is a diagram illustrating an embodiment of a display for a user interface for a data-driven spreadsheet chart system.

FIG. 13 is a diagram illustrating an embodiment of a display for a user interface for a data-driven spreadsheet chart system. In some embodiments, workbook 1301 is workbook 1201 of FIG. 12 and the display of FIG. 12 precedes the display shown in FIG. 13. Workbook 1301 includes selected cells 1302. As shown in FIG. 13, the user selects selected cells 1302, which includes a group of cells. Selected cells 1302 is highlighted and used as a destination for a chart formula and a visual rendering of a chart. Since selected cells 1302 is composed of more than one cell (a region four cells wide and ten cells tall that corresponds to location I1:L10), the group of cells will be merged into a single cell. Once selected cells 1302 is merged into a single cell and the chart function is complete, a chart is rendered in the area defined by selected cells 1302. By selecting more or fewer cells for selected region 1302, a user defines the size and placement of the rendered chart.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data-driven spreadsheet chart system, comprising an interface to:
receive a formula entered into a cell of a spreadsheet document, wherein the formula includes a function that references a set of data, wherein the formula takes as arguments a chart-type parameter and a primary-data parameter, wherein the formula takes a base configuration parameter, the base configuration parameter including a location of a legend, a title, a format and a location of an axis, or any combination thereof, and wherein the formula takes an override parameter to override the base configuration parameter, the base configuration parameter corresponding to a standard formatting style; and a processor to:
host the spreadsheet document;
compile the formula into a byte code version, comprising to:
perform a syntactic check, a semantic check, or both on the formula; and
in response to a determination that syntactic check, a semantic check, or both are completed without error, generate the byte code version from the formula using a compiler; and
render a visual representation of the data for display entirely within the cell based on the base configuration parameter, wherein the rendering of the visual representation is performed using the byte code version, wherein the visual representation comprises the legend, the title, the axis, or any combination thereof, wherein the visual representation comprises a chart, wherein the visual representation exists in the same plane as neighboring cells of the cell, and wherein the visual representation exists in the same sheet of the spreadsheet document as the neighboring cells of the cell.

2. The system of claim 1, wherein the function comprises a chart function.

3. The system of claim 1, wherein the processor is to store the byte code version.

4. The system of claim 1, wherein the cell is created by merging multiple cells.

5. The system of claim 1, wherein the chart has a type.

6. The system of claim 5, wherein the type is a sparkline.

7. The system of claim 5, wherein the type comprises one or more of the following: a line type, a pie type, a column type, a bar type, a scatter type, a tree type, a gauge type, a bubble type, and an area type.

8. The system of claim 1, wherein the cell includes an argument that refers to a second formula nested in the cell or of a second cell.

9. The system of claim 1, wherein the formula takes a secondary-data parameter.

10. The system of claim 1, wherein changing the arguments results in an automatic change to the visual representation of the data.

11. The system of claim 1, wherein the processor is to determine whether a user is authorized to access the set of data.

12. A method for data-driven spreadsheet chart system, comprising:
receiving a formula entered into a cell of a spreadsheet document, wherein the formula includes a function that references a set of data, wherein the formula takes as arguments a chart-type parameter and a primary-data parameter wherein the formula takes a base configuration parameter, the base configuration parameter including a location of a legend, a title, a format and a location of an axis, or any combination thereof, and wherein the formula takes an override parameter to override the base configuration parameter, the base configuration parameter corresponding to a standard formatting style;
hosting the spreadsheet document;
compiling the formula into a byte code version, comprising:
performing a syntactic check, a semantic check, or both on the formula; and
in response to a determination that syntactic check, a semantic check, or both are completed without error, generating the byte code version from the formula using a compiler; and
rendering, using a processor, a visual representation of the data for display entirely within the cell based on the base configuration parameter, wherein the rendering of the visual representation is performed using the byte code version, wherein the visual representation comprises a chart, wherein the visual representation comprises the legend, the title, the axis, or any combination thereof, wherein the visual representation exists in the same plane as neighboring cells of the cell, and wherein the visual representation exists in the same sheet of the spreadsheet document as the neighboring cells of the cell.

13. A computer program product for data-driven spreadsheet chart system, the computer program product being embodied in a non-transitory computer readable storage medium and comprising computer instructions for:
receiving a formula entered into a cell of a spreadsheet document, wherein the formula includes a function that references a set of data, wherein the formula takes as arguments a chart-type parameter and a primary-data parameter, wherein the formula takes a base configuration parameter, the base configuration parameter including a location of a legend, a title, a format and a location of an axis, or any combination thereof, and wherein the formula takes an override parameter to override the base configuration parameter, the base configuration parameter corresponding to a standard formatting style;
hosting the spreadsheet document;
compiling the formula into a byte code version, comprising:
performing a syntactic check, a semantic check, or both on the formula; and
in response to a determination that syntactic check, a semantic check, or both are completed without error, generating the byte code version from the formula using a compiler; and
rendering, using a processor, a visual representation of the data for display entirely within the cell based on the base configuration parameter, wherein the rendering of the visual representation is performed using the byte code version, wherein the visual representation comprises a chart, wherein the visual representation comprises the legend, the title, the axis, or any combination thereof, wherein the visual representation exists in the same plane as neighboring cells of the cell, and wherein the visual representation exists in the same sheet of the spreadsheet document as the neighboring cells of the cell.

* * * * *